US012292860B2

(12) United States Patent
S et al.

(10) Patent No.: US 12,292,860 B2
(45) Date of Patent: May 6, 2025

(54) OPTIMAL DOWNTIME SUGGESTION FOR HYBRID IT LANDSCAPES

(71) Applicant: SAP SE, Walldorf (DE)

(72) Inventors: Resmi K S, Palakkad (IN); Akilandeswari V, Bangalore (IN)

(*) Notice: Subject to any disclaimer, the term of this patent is extended or adjusted under 35 U.S.C. 154(b) by 1 day.

(21) Appl. No.: 17/975,959

(22) Filed: Oct. 28, 2022

(65) Prior Publication Data

US 2024/0143558 A1 May 2, 2024

(51) Int. Cl.
*G06F 16/00* (2019.01)
*G06F 16/21* (2019.01)
*G06F 16/25* (2019.01)

(52) U.S. Cl.
CPC ............ *G06F 16/21* (2019.01); *G06F 16/256* (2019.01)

(58) Field of Classification Search
CPC .............................. G06F 16/21; G06F 16/256
USPC .................................................. 707/600–899
See application file for complete search history.

(56) References Cited

U.S. PATENT DOCUMENTS

| | | | | |
|---|---|---|---|---|
| 2012/0254395 | A1* | 10/2012 | Bonas | H04L 41/0836 709/224 |
| 2013/0151682 | A1* | 6/2013 | Kruempelmann | H04L 43/10 709/224 |
| 2019/0253311 | A1* | 8/2019 | Hockett | H04L 41/5041 |
| 2020/0319874 | A1* | 10/2020 | Hoprich | G06N 20/00 |

* cited by examiner

*Primary Examiner* — Charles Rones
*Assistant Examiner* — Shirley D Hicks
(74) *Attorney, Agent, or Firm* — Buckley, Maschoff & Talwalkar LLC

(57) ABSTRACT

A system and method including receiving a request for a suggested downtime for a specified system within a hybrid information technology (IT) landscape including at least one on premise system and at least one cloud-based system; determine, based on one or more executable processes depending on the specified system, at least one on premise contributor and at least one cloud-based contributor to the downtime for the hybrid IT landscape; determine an ordered ranking for each of the at least one on premise contributor and the at least one cloud-based contributor; generate, based on a combination of the at least one on premise contributor and the at least one cloud-based contributor and their respective associated ordered ranking, one or more downtime time slots; and present, in reply to the request and based on the generated downtime time slots, the suggested downtime for the specified system.

20 Claims, 14 Drawing Sheets

300

| CONTRIBUTOR | TIME | RANK | CONDITION |
|---|---|---|---|
| Cloud CMP | 7:30 – 8:30 | 5 | Include |
| OnPrem CMP | 8:30 – 9:30 | 4 | Include |
| Cloud AST | 8:30 – 18:30 | 7 | Exclude |
| Peak Business Hours | 10:00 – 12:00<br>13:00 – 14:00 | 8 | Exclude |
| Training – 21 June | 15:00 – 16:00 | 6 | Exclude |

305 → CONTRIBUTOR, 310 → TIME, 315 → RANK, 320 → CONDITION

| CONTRIBUTOR | Systems/Services | Additional Details | Rank |
|---|---|---|---|
| Business Process | Sys_2 | Overlaps Between Processes | 7 |
| Incident Resolution | Sys_6, Sys_7, Sys_8 | Note Available for High Priority Issue | 5 |
| Release Information | Sys_6, Sys_7, Sys_8 | New Release on 20 June | 4 |

405 → CONTRIBUTOR, 410 → Systems/Services, 415 → Additional Details, 420 → Rank

| Suggested Timeslots | | | |
|---|---|---|---|
| Slot 1 | 7:30 - 8:30 | 26-Jun | User Selects |
| Slot 2 | 7:00 - 7:30 | 26-Jun | |
| Slot 3 | 6:00 - 7:00 | 26-Jun | |
| Slot 4 | 7:30 - 8:30 | 27-Jun | |

*FIG. 6*

| Services | 2ⁿᵈ Run on 13 July– Suggest Downtime for Sys1 (part of L2C, H2R) | | |
|---|---|---|---|
| | Contributor | Time | Rank |
| CloudSys_7 (H2R, L2C) | Cloud CMP | 7:30 - 8:30 | 6 |
| CloudSys_2 | Cloud CMP | 7:00 - 8:00 | 6 |
| CloudSys_7 | Cloud CMP | 7:30 - 8:30 | 6 |
| CloudSys_3 | Cloud CMP | 7:30 - 8:30 | 6 |
| CloudSys_4 | Cloud CMP | 7:30 - 8:30 | 6 |
| CloudSys_5 | Cloud CMP | 7:30 - 8:30 | 6 |
| CloudSys_6 | Cloud CMP | 7:30 - 8:30 | 6 |
| Sys_1 | OnPrem CMP | 7:00 - 8:00 | 5 |
| Sys_2 | OnPrem CMP | 7:00 - 8:00 | 5 |
| Sys_3 | OnPrem CMP | 6:00 - 7:00 | 4 |
| Sys_4 | OnPrem CMP | 6:00 - 7:00 | 4 |
| Sys_5 | OnPrem CMP | 6:00 - 7:00 | 4 |
| All | Cloud AST | 8:30 - 18:30 | 7 Exclusion |
| All | Peak Business Hours | 10:00 - 12:00 | 8 Exclusion |
| All | Peak Business Hours | 13:00 - 14:00 | 8 Exclusion |

| Suggested Timeslots | | |
|---|---|---|
| Slot 1 | 7:30 - 8:30 | 16-Jul |
| Slot 2 | 6:00 – 7:00 | 16-Jul |
| Slot 3 | 7:00 – 7:30 | 16-Jul |
| Slot 4 | 7:30 - 8:30 | 17-Jul |

2nd Run on 13 July – Suggest Downtime for Sys1 (part of L2C, H2R)

| Services | Contributor | Time | Rank | |
|---|---|---|---|---|
| CloudSys_7 (H2R, L2C) | Cloud CMP | 7:30 - 8:30 | 6 | |
| CloudSys_2 | Cloud CMP | 7:00 - 8:00 | 6 | |
| CloudSys_7 | Cloud CMP | 7:30 - 8:30 | 6 | |
| CloudSys_3 | Cloud CMP | 7:30 - 8:30 | 6 | |
| CloudSys_4 | Cloud CMP | 7:30 - 8:30 | 6 | |
| CloudSys_5 | Cloud CMP | 7:30 - 8:30 | 6 | |
| CloudSys_6 | Cloud CMP | 7:30 - 8:30 | 6 | |
| Sys_1 | OnPrem CMP | 7:00 - 8:00 | 5 | |
| Sys_2 | OnPrem CMP | 7:00 - 8:00 | 5 | |
| Sys_3 | OnPrem CMP | 6:00 - 7:00 | 4 | |
| Sys_4 | OnPrem CMP | 6:00 - 7:00 | 4 | |
| Sys_5 | OnPrem CMP | 6:00 - 7:00 | 4 | |
| All | Cloud AST | 8:30 - 18:30 | 7 | Exclusion |
| All | Peak Business Hours | 10:00 - 12:00 | 8 | Exclusion |
| All | Peak Business Hours | 13:00 - 14:00 | 8 | Exclusion |
| New | Customer Preferred time | 21:00 - 22:00 | 10 | Include |

| Suggested Timeslots | | |
|---|---|---|
| Slot 1 | 21:00 – 22:00 | 16-Jul |
| Slot 2 | 7:30 - 8:30 | 16-Jul |
| Slot 3 | 7:00 – 7:30 | 16-Jul |
| Slot 4 | 6:00 – 7:00 | 16-Jul |

*FIG. 10*

| Services | Contributor | Time | Rank | |
|---|---|---|---|---|
| | 1st Run on 20 July - Suggest downtime for S4D (part of L2C, H2R) | | | |
| CPI (H2R, L2C) | Cloud CMP | 7:30 - 8:30 | 5 | |
| MDI | Cloud CMP | 7:00 - 8:00 | 5 | |
| CPI | Cloud CMP | 7:30 - 8:30 | 5 | |
| CommerceCloud, | Cloud CMP | 7:30 - 8:30 | 5 | |
| Service Cloud, | Cloud CMP | 7:30 - 8:30 | 5 | |
| Marketing Cloud | Cloud CMP | 7:30 - 8:30 | 5 | |
| SAP Sales Cloud | Cloud CMP | 7:30 - 8:30 | 5 | |
| S4H | OnPrem CMP | 7:00 - 8:00 | 4 | |
| BW | OnPrem CMP | 7:00 - 8:00 | 4 | |
| SRM | OnPrem CMP | 6:00 - 7:00 | 4 | |
| SCM | OnPrem CMP | 6:00 - 7:00 | 4 | |
| CRM | OnPrem CMP | 6:00 - 7:00 | 4 | |
| All | Cloud AST | 8:30 - 18:30 | 7 | Exclusion |
| All | Peak Business Hours | 10:00 - 12:00 | 8 | Exclusion |
| All | Peak Business Hours | 13:00 - 14:00 | 8 | Exclusion |
| S4Q | Training (S4Q) - 21 June | 3:00 - 5:00 | 6 | Exclusion |

| Suggested Timeslots | | |
|---|---|---|
| Slot 1 | 21:00 – 22:00 | 23-Jul |
| Slot 2 | 7:30 - 8:30 | 23-Jul |
| Slot 3 | 7:00 – 7:30 | 23-Jul |
| Slot 4 | 6:00 – 7:00 | 23-Jul |

```
RECEIVE A REQUEST FOR A SUGGESTED DOWNTIME FOR
A SPECIFIED SYSTEM WITHIN A HYBRID IT LANDSCAPE
                                                    1305
```

```
DETERMINE, BASED ON ONE OR MORE EXECUTABLE
PROCESSES DEPENDING ON THE SPECIFIED SYSTEM,
AT LEAST ONE ON PREMISE CONTRIBUTOR AND AT
LEAST ONE CLOUD-BASED CONTRIBUTOR TO THE
DOWNTIME FOR THE HYBRID IT LANDSCAPE
                                                    1310
```

```
DETERMINE AN ORDERED RANKING FOR EACH OF THE AT
LEAST ONE ON PREMISE CONTRIBUTOR AND THE
AT LEAST ONE CLOUD-BASED CONTRIBUTOR
                                                    1315
```

```
GENERATE, BASED ON INPUT INCLUDING A COMBINATION OF
THE AT LEAST ONE ON PREMISE CONTRIBUTOR AND THE AT
LEAST ONE CLOUD-BASED CONTRIBUTOR AND THEIR
RESPECTIVE ASSOCIATED ORDERED RANKING TO A
PRETRAINED MACHINE LEARNING MODEL, ONE OR MORE
DOWNTIME TIME SLOTS
                                                    1320
```

```
PRESENT, IN REPLY TO THE REQUEST AND BASED ON THE
GENERATED DOWNTIME TIME SLOTS, THE SUGGESTED
DOWNTIME FOR THE SPECIFIED SYSTEM
                                                    1325
```

*FIG. 13* ated, according to an example embodiment;

OPTIMAL DOWNTIME SUGGESTION FOR HYBRID IT LANDSCAPES

BACKGROUND

An enterprise or other entity may have and maintain one or more on premise information technology (IT) systems to implement one or more of their operational processes. Increasingly, organizations and other entities are also using and relying on cloud-based solutions to implement, in part, their operational processes. In some instances, one or more different operational processes of an entity span across an entity's on premise systems and cloud solutions. IT administrators may plan downtimes for their on premise systems to perform system upgrades, install software patches, database management tasks, etc. A challenge encountered by many users having a hybrid IT landscape including both on premise systems and cloud solutions is how can they plan system downtimes so that the impact to their operational processes is kept to a minimum.

Accordingly, it would therefore be desirable to provide a framework to determine and suggest optimal downtimes for hybrid IT landscapes to, for example, minimize disruptions to operational processes.

BRIEF DESCRIPTION OF THE DRAWINGS

FIG. 3 is an illustrative tabular listing including contributors to a hybrid IT landscape downtime, according to an example embodiment;

FIG. 4 is an illustrative tabular listing including additional contributors to a hybrid IT landscape downtime, according to an example embodiment;

FIG. 6 is an illustrative tabular listing of suggested timeslots for a hybrid IT landscape downtime, according to some example embodiments;

FIG. 7 is another illustrative tabular listing including an aggregate of contributors to a hybrid IT landscape downtime, according to an example embodiment;

FIG. 8 is another illustrative tabular listing of suggested timeslots for a hybrid IT landscape downtime, according to some example embodiments;

FIG. 9 is an illustrative tabular listing including an aggregate of contributors to a hybrid IT landscape downtime, according to an example embodiment;

FIG. 10 is an illustrative tabular listing of suggested timeslots for a hybrid IT landscape downtime, according to some example embodiments;

FIG. 11 is yet another illustrative tabular listing including an aggregate of contributors to a hybrid IT landscape downtime, according to an example embodiment;

FIG. 12 is yet another illustrative tabular listing of suggested timeslots for a hybrid IT landscape downtime, according to some example embodiments;

FIG. 13 is an illustrative process flow, according to an example embodiment;

DETAILED DESCRIPTION

Figure 1:
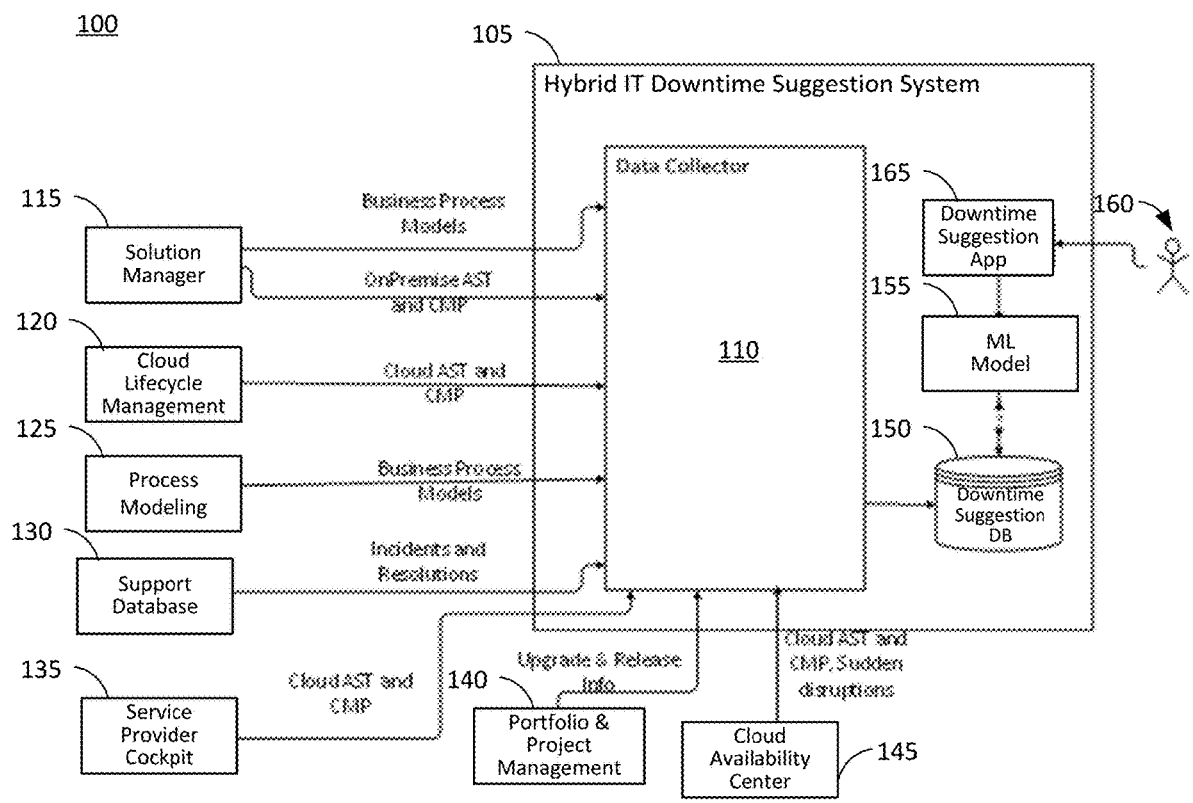
FIG. 1 is an illustrative depiction of a system architecture, according to an example embodiment.

The following description is provided to enable any person in the art to make and use the described embodiments. Various modifications, however, will remain readily apparent to those in the art.

In some aspects of the present disclosure, one embodiment includes a framework or architecture to aggregate all of the different factors or contributors that might influence a downtime of a particular system, where the contributors may be related to both on premise systems and cloud solutions for processes that encompass a hybrid IT landscape. The framework or architecture may further provide a mechanism to suggest an optimal downtime for on premise system(s) that also accounts for cloud solutions and systems so that overall business process disruptions are kept to a minimum. In some aspects, technical benefits and advantages provided by the present disclosure include, for example, efficient and accurate systems and methods to reduce downtimes of hybrid IT landscapes. One example instance of a practical application of the present disclosure includes determining and providing suggested downtime timeslots to a user of a system and method herein so that the user (e.g., service and system provider customer, etc.) that might be selected and used to plan downtimes for the user's hybrid IT landscape. In some instances, the user may experience reduced downtimes and disruptions to operational processes that span across their hybrid IT landscape.

As an illustrative example context where the systems and processes of a hybrid downtime suggestion system disclosed herein may be useful, some aspects regarding the planning of downtimes for a hybrid IT landscape will now be discussed. In some instances, a user planning downtimes to their on premise systems may want the downtimes to be as minimal as possible so as limit the disruptions to their operational processes. As an example, the user may plan to bring a specific on premise system (e.g., SYS_1) related to an operational process (e.g., a hire-to-retire, H2R, process) down on the upcoming Saturday between 9:00 AM and 10:00 AM. However, a cloud-based system (e.g., Cloud-Sys_1) used to provide the H2R operational process may have a planned downtime of 10:00 AM-11:00 AM (e.g., the downtime for the cloud system may be centrally scheduled by an organization) for the upcoming Saturday. As such, the total downtime for the customer implementing the operational process of this example (i.e., H2R) would be two (2) hours, 9:00 AM-11:00 AM, due to the combined downtime of the on premise system (i.e., Sys_1; downtime=9:00 AM-10:00 AM) and the cloud solution (i.e., CloudSys_1; 10:00 AM-11:00 AM). However, this might not be the most optimal downtime for the customer that causes the least disruption of the H2R operational process since, for example, the present example only considered the planned downtime for the two (2) systems associated with the H2R operational process. In many instances, other additional factors might contribute to the downtime related to systems and operational process in a hybrid landscape.

In some embodiments, a contributor associated with a cloud solution is a cloud maintenance period, cloud CMP, that specifies scheduled downtimes for maintenance of the respective cloud solution. A contributor associated with an on premise system is a contractual maintenance period, OnPrem CMP, that specifies scheduled downtimes for maintenance of the respective on premise system. Another contributor that may be associated with an on premise system is an agreed service time, AST, (e.g., cloud CMP) that specifies times the system is expected to be available for use by the customer to, for example, execute their operational processes. Other contributors might include downtime(s) to install or attend to upgrades and software patches for on premise systems, and time(s) to address incidents from service disruptions for cloud solutions. Still other contributors might include time(s) excluded from downtime considerations such as, for example, peak business hours for a customer, training periods for a customer's operational process(es) where the related on premise systems and cloud solutions need to be available, etc.

In some aspects, cloud solutions used by an entity may be maintained by different organizations, service providers, etc., where each might maintain their own maintenance schedule. While an entity might be aware of some of their on premise maintenance schedules, correlations between the on premise systems and their cloud solutions systems might not be discernable to the user given the multiple different contributors of the different systems (on premise and cloud-based) where such information is not available from any one source.

FIG. 1 is an illustrative depiction of an overall system architecture 100, according to an example embodiment. System architecture 100 includes a hybrid IT downtime suggestion system 105. In some embodiments, the hybrid IT downtime suggestion system includes a data collector 110. Data collector 110 may be implemented by one or more processors that execute program code or instructions to collect and aggregate different contributors (e.g., influencers, factors, etc.) to a downtime for the hybrid IT downtime suggestion system. In the example of FIG. 1, data collector 110 is configured to receive data or indications of different types of downtime contributors from a plurality of different sources. The different sources of downtime contributors may include one or more of the contributors shown in FIG. 1, though not limited to the specific types and combinations depicted in FIG. 1.

One source of contributors in FIG. 1 is a solution manger 115 that provides orchestration of customer business processes. Data collector 110 may obtain information regarding business process models used by the customer and on premise AST and CMP contributors from solution manager 115. Cloud lifecycle management component 120 may be a source for cloud AST and CMP contributors. In the example of FIG. 1, an application or service providing process modeling 125 may also be a source for business process models. Applications or services 130 providing management of a support database might source incidents and resolutions type contributors, whereas a service provider cockpit application or service 135 may provide cloud AST and CMP contributor information. In some instances, a portfolio and project management application 140 might provide upgrade and release information for contributors related thereto to the data collector. A cloud availability center, depicted at 145, may be a source of contributor information including cloud AST and CMP, as well as incident disruption related contributor information to data collector 110 of the hybrid IT downtime suggestion system.

In some aspects, the varied contributor information collected by data collector 110 may be sent, transmitted to, or otherwise provided to a downtime suggestion database 150. Downtime suggestion database 150 may operate to, for example, aggregate and store the collected contributor information. A machine learning (ML) model 155 may be executed, using the collected contributor information as input(s) thereto, to determine optimal downtime suggestions for a user. In some aspects, a user (e.g., user 160) might submit a request for a suggested downtime for a specific one or more of their on premise systems to the hybrid IT downtime suggestion system 105, via a downtime suggestion application 165 using, for example, an application programming interface (API) provided by the hybrid IT downtime suggestion system, or some other interface with the hybrid IT downtime suggestion system. ML model 155 of the hybrid IT downtime suggestion system may be executed, in response to the user request, and the hybrid IT downtime suggestion system may operate to provide suggested downtime(s) to the user that considers all of the contributors relevant to the user's request. The suggested downtime(s) might be provided via a user interface presented in a browser on a mobile device (not shown) of the user.

In some aspects, the hybrid IT downtime suggestion system is configured to provide suggested downtime(s) to the user since hybrid IT downtime suggestion system 105 collects and aggregates all of the downtime contributors associated with the different on premise and cloud systems across the customer's hybrid IT landscape.

In some instances, ML model 155 may be pretrained using general knowledge related to the systems, both on premise and cloud-based, that may be included in a customer user's hybrid IT landscape. The general knowledge information may be based on information and data known to the system and service providers and vendors thereof. In this manner, a pretrained ML model may be deployed to a customer enabled to suggest downtime(s) to the user that considers all of the contributors relevant to the user's request. In some embodiments, the pretrained ML model may be used in a first one or set of executions for a particular customer, wherein the ML model might use default values and settings for example, in weighting the relative rank of the different downtime contributors. After the first one or set of executions of the ML for the particular customer, one or more values and settings used by the ML model might be adjusted based on feedback obtained from the particular customer in the form of, for example, user selections provided in reply to the suggested downtime(s) provided by hybrid IT downtime suggestion system 105. The feedback obtained from the particular customer may be used to retrain the ML model so that it might, for example, generate suggested downtime(s) more appropriate and accurate for the particular customer's hybrid IT landscape and preferences.

Figure 2:
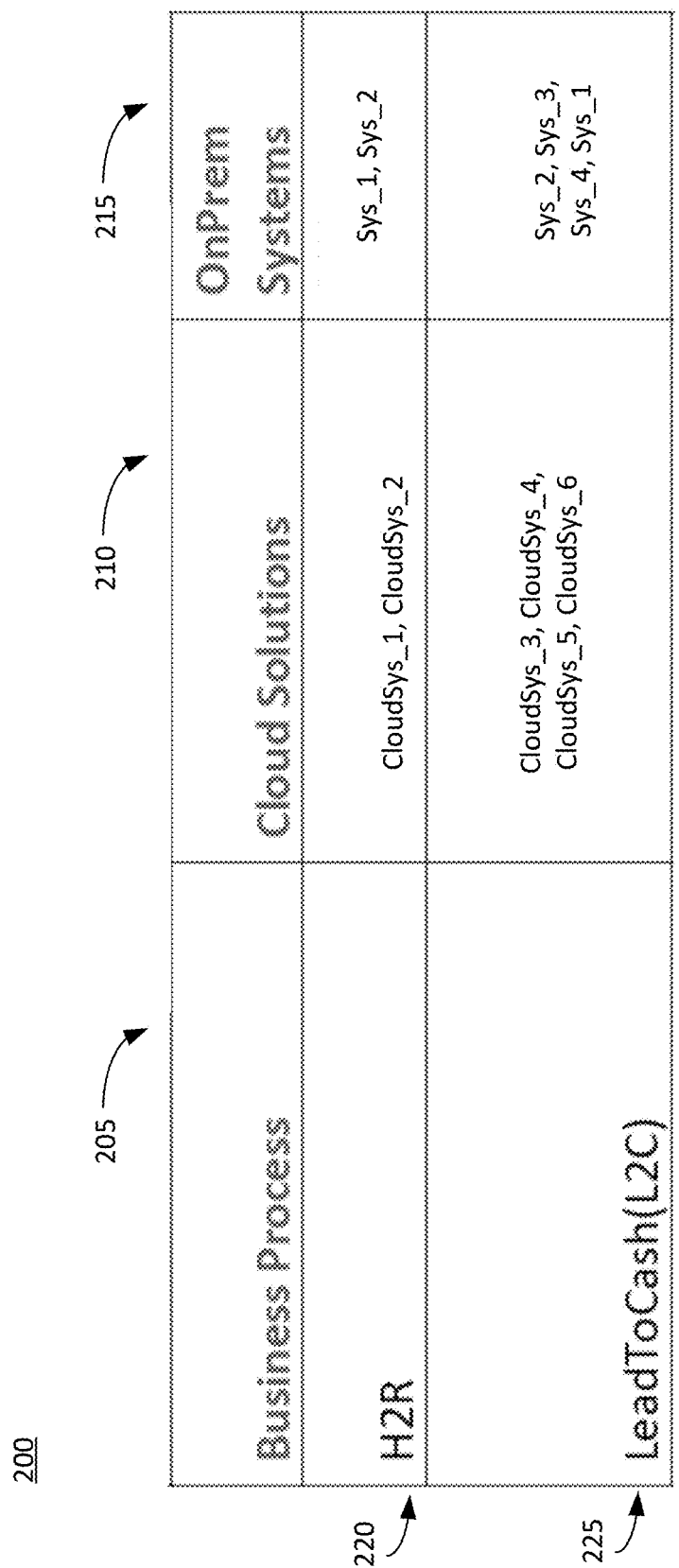
FIG. 2 is an illustrative tabular listing of processes and associated IT landscape systems, according to an example embodiment.

A number of examples will be discussed hereinbelow to illustrate some of the features and aspects of the systems and methods of the present disclosure. FIG. 2 is an illustrative tabular listing of processes and associated hybrid IT landscape systems, according to an example embodiment. As shown in FIG. 2, table 200 includes a column 205 listing operational processes of a customer and columns 210 and 215 listing the systems those processes depend on to execute or implement the processes provided by cloud solutions and on premise systems, respectively. For the present example, the operational processes include a hire to retire (H2R) process 220 that depends on cloud solution Cloud_Sys1 and Cloud_Sys2 and on premise systems Sys_1 and Sys_2, as well as a lead to cash (L2C) process 225 that depends on cloud solution Cloud_Sys3, Cloud_Sys4, Cloud_Sys5, and Cloud_Sys6 and on premise systems Sys_2, Sys_3, Sys_4, and Sys_1. As demonstrated by this example, a particular system, whether on premise or cloud-based, might be used or otherwise related to more than one operational process (e.g., on premise system Sys_1 that is used by both the H2R and the L2C processes).

FIG. 3 is an illustrative tabular listing including contributors to an IT landscape downtime, according to an example embodiment. In particular, table 300 includes an illustrative example listing of scheduled downtimes for an upcoming month (e.g., June) for a customer. Table 300 includes a column 305 listing the contributor (i.e., reason) for scheduling or not scheduling a downtime, the related ranges of time 310 associated with each contributor, a relative ranking for each contributor 315, and whether the contributor allows a scheduled shutdown during the specified time range (i.e., include) or prohibits a scheduled downtime in the specified time range (i.e., exclude) at 320.

FIG. 4 is an illustrative tabular listing including additional contributors to a hybrid IT landscape downtime, according to an example embodiment. The example of FIG. 4 relates to the same customer as FIG. 3 and includes an illustrative example listing of different contributor types 405, the systems associated with the contributors 410, additional details related to the contributor 415, and a relative ranking 420 for each contributor in table 400. As demonstrated in FIG. 4, a particular system might be related to more than one contributor (e.g., systems Sys_6, Sys_7, and Sys_8 all associated with both the "incident resolution" and "release information" types of contributors).

Figure 5:
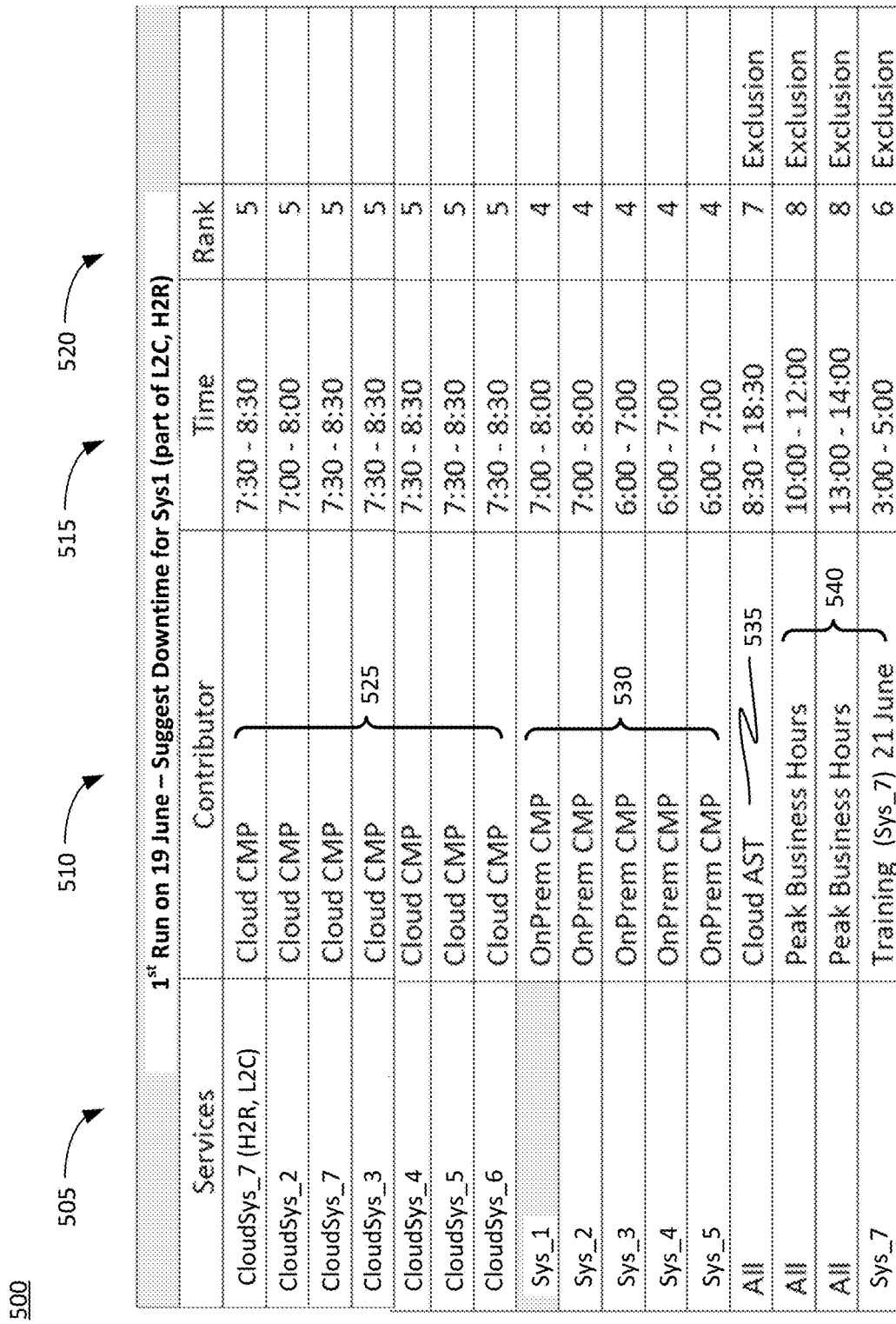
FIG. 5 is an illustrative tabular listing including an aggregate of contributors to a hybrid IT landscape downtime, according to an example embodiment.

FIG. 5 is an illustrative tabular listing including an aggregate of contributors to a hybrid IT landscape downtime for the customer introduced above, according to an example embodiment. In particular, table 500 includes an illustrative example listing of contributors 510 and scheduled downtimes 515 for the associated systems and services 505 in the month of June for the customer. The information listed in table 500 may be generated based on information aggregated by a system herein (e.g., FIG. 1, data collector 110 of the hybrid IT downtime suggestion system 105). More particularly, the information in table 500 may be generated by executing a ML model configured to generate suggested downtimes for a hybrid IT landscape in reply to a request to supply a suggested downtime for a specific system of a customer. In the example of FIG. 5, the customer has requested a suggested downtime for their hybrid IT landscape on June 19$^{th}$, for their on premise system, Sys1, where the request is a first request of the system by this customer. Due to the request being a first request for the customer, the pretrained ML model (e.g., FIG. 1, ML model 155) may use default or standard rankings 520 for each of the contributors 510 to downtime for the services 505 associated with the specific system (i.e., Sys1) included in the customer's request. In the example of FIG. 5, the specific system included in the customer's request (i.e., Sys1) for a suggested downtime is depended on or otherwise a part of two (2) processes, including L2C and H2R as shown in FIG. 2, table 200.

As shown in FIG. 5, table 500 lists the related, relevant contributors including the cloud CMPs 525 for the services 505 related to the specific system (i.e., Sys1) included in the customer's request, the on premise CMPs 530 for the services 505 related to the specific system included in the customer's request, as well as the cloud AST 535, and the peak business hours, and the scheduled training 540 related to the specific system included in the customer's request. The ML model herein will consider all of the contributors and associated services for the impacted operational processes (i.e., L2C and H2R) depicted in FIG. 5 to determine a reply to the customer's request for a suggested downtime for their hybrid IT landscape.

Based on the cloud CMPs 525 and the on premise CMPs 530 for which downtimes 515 have already been planned and the cloud AST 535, peak business hours, and scheduled training period for which a scheduled downtime is not permitted, the ML model herein may analyze the contributor and time range information to determine permissible downtimes for both the associated on premise systems and associated cloud-based systems (i.e., collectively, services 505).

FIG. 6 is an illustrative tabular listing of suggested timeslots for a hybrid IT landscape downtime, according to some example embodiments. Table 600 includes a listing of suggested timeslots determined in reply to the request from the customer of the FIG. 5 example. Based on a combination of the scheduled downtimes as indicated by the cloud CMPs 525 and the on premise CMPs 530 (e.g., generally 6:00-8:00) and the excluded times as indicated by the cloud AST 535 and the peak business hours and scheduled training period 540, the ML model determines and suggests the downtimes shown in table 600. For example, slot 1 (7:30-8:30) is suggested since it coincides the most with all of the cloud CMPs 525 and some of the on premise CMPs 530, where the cloud CMPs are afforded more weight given their relative higher rank. Slot 2 (7:00-7:30) is suggested since a few of the cloud CMPs are scheduled to be down 7:00-7:30. Slot 3 (6:00-7:00) is suggested since it coincides with some of the on premise service's scheduled downtimes and one of the already planned cloud service's cloud CMP. The rankings associated with the on premise CMPs (i.e., rank=4) and the cloud CMPs (i.e., rank=5) influences the suggested time of 6:00-7:00 being positioned third in table 600, lower that the slot 1 and slot 2 suggestions. In an instance the customer would rather not select a downtime on 26 June, slot 4 (7:30-8:30, 27 June) is also suggested to the customer to provide, for example, some flexibility to the customer. The suggested downtime of slot 4 (7:30-8:30) is suggested since it, like slot 1, coincides the most with all of the cloud CMPs 525 and some of the on premise CMPs 530.

In some embodiments, a hybrid IT downtime suggestion system herein may receive a user's (e.g., a customer's) reply to a suggested downtime and use their response as feedback to further train the ML model used by the hybrid IT downtime suggestion system to determine suggested downtimes. As an example, a customer selects slot 1 (7:30-8:30) that coincides with all of the cloud CMPs 525. As such, the ML model may increase the rank (i.e., +1) of the cloud CMPs from 5 to 6 for this customer. The time for Slot 1 also coincides with services Sys_1 and Sys_2, so the rank for these services may be increased (i.e., +1) from 4 to 5. Also, the services Sys_1 and Sys_2 are part of the H2R process (see FIG. 2), so the rank for the H2R process may be increased (i.e., +1) from 5 to 6.

FIG. 7 is an illustrative tabular listing including an aggregate of contributors to a hybrid IT landscape downtime, according to an example embodiment. In particular, table 700 lists the related, relevant contributors 710 related to the specific systems 705 (e.g., Sys1) included in the customer's request, including the cloud CMPs 725 and the on premise CMPs 730 for services 705, as well as the cloud AST 735, and the peak business hours 740 related to the specific system included in the customer's request. Table 700 lists the time 715 and rank 720 associated with each contributor 705. Table 700 700 is updated relative to table 600 to reflect the ranking changes determined by an ML model herein based on feedback received from the customer.

The information shown in table 700 may be used on a second run of the hybrid IT downtime suggestion system, such as a second run of the system for a suggested downtime on 13 July.

FIG. 8 is another illustrative tabular listing of suggested timeslots for an IT landscape downtime, according to some example embodiments. In some embodiments, table 800 includes a listing of suggested timeslots determined in reply to the request from the customer of the FIG. 7 example. Based on a combination of the scheduled downtimes indicated by the cloud CMPs 725 and the on premise CMPs 730 and their associated, updated order rankings, as well as the excluded times indicated by the cloud AST 735 and the peak business hours 740, the ML model determines and suggests the downtimes shown in table 800 for the indicated dates of 16 July and 17 July. In an instance the customer would rather not select any of the suggested downtimes in table 8, the customer may provide, for example, an indication that they want a downtime for 21:00-22:00 on 14 July. The customer's selected downtime is retained by the system and provided as "negative" feedback to the system (i.e., "negative" since it is not one of the suggested downtimes determined and suggested by the system herein).

In some embodiments, a hybrid IT downtime suggestion system herein may receive the customer's selected downtime and use their response as "negative" feedback to further train the ML model used by the hybrid IT downtime suggestion system to determine suggested downtimes for their hybrid IT landscape. In some aspects, the customer's particular reasoning for selecting a downtime of 21:00-22:00 on 14 July may not be fully understood. However, the hybrid IT downtime suggestion system herein may retain their downtime selection and the ML model may use it to further learn the preferences of this particular customer. For example, the selected downtime of 21:00-22:00 might be retained as a potential factor or contributor (e.g., a "personal preference" contributor) for this particular customer.

In some embodiments, the selected downtime of 21:00-22:00 might not immediately be considered a new factor or contributor used in determining suggested downtimes since its selection might be an anomaly or one time desire of the customer. In some embodiments, the 21:00-22:00 downtime selection might be retained as a potential factor or contributor to see if this selection is demonstrated, by repeated or continued feedback from the customer, as being a contributor to the customer's selected downtime for their hybrid IT landscape. In some embodiments, the selection of 21:00-22:00 might be retained as a potential factor or contributor for a minimum or threshold number of selections (e.g., five (5), six (6), or some other specified value) by the customer before it is promoted and considered a new contributor by a ML model and a hybrid IT downtime system herein. For example, if the threshold is defined to be five (5) and the customer actually selects the time of 21:00-22:00 despite other suggested downtimes by the system five or more times, then the system may convert the potential factor of 21:00-22:00 to a customer's "preferred downtime" contributor with a rank of, for example 10. Upon continued selection by the customer, the rank associated with the time of 21:00-22:00 might be increased.

FIG. 9 is an illustrative tabular listing including an aggregate of contributors to a hybrid IT landscape downtime, according to an example embodiment. In particular, table 900 is similar to table 700, but is updated to add a new contributing factor of a "customer preferred time" 905. The new contributing factor of a "customer preferred time" 905 may be determined by the ML model herein after successive executions (e.g., 5+ iterations) of the hybrid IT downtime suggestion system, wherein the customer selected the time of 21:00-22:00. Based on the demonstrated and repeated selection of the time of 21:00-22:00 by the customer, the time 21:00-22:00 is determined by the ML model to be a new contributor for this customer.

FIG. 10 is an illustrative tabular listing of suggested timeslots for a hybrid IT landscape downtime, according to some example embodiments. In particular, table 1000 includes suggested downtimes determined after the addition of the "customer preferred time" of 21:00-22:00 as a contributor for the customer. As shown, the time of 21:00-22:00 is presented as one of the highest suggested downtimes by the system.

FIGS. 11 and 12 relate to another example to demonstrate some of the features of some embodiments of a hybrid IT downtime suggestion system herein. FIG. 11 is an illustrative tabular listing 1100 including an aggregate of contributors to an IT landscape downtime for this example related to a first execution of the hybrid IT downtime suggestion system for a particular customer. FIG. 12 is an illustrative tabular listing 1200 of suggested timeslots determined for the customer based on the contributors outlined in FIG. 11. In this example, the customer selects a time of 6:00-8:00 that spans, at least partially, across all of the listed contributors, including the on premise CMPs and the cloud CMPs, with neither the on premise CMPs nor the cloud CMPs being preferred. Accordingly, in this example, neither the on premise CMPs nor the cloud CMPs rankings will be modified based on feedback related to this example execution of the hybrid IT downtime suggestion system.

Accordingly, some aspects of some embodiments disclosed herein include treating a hybrid IT landscape as an entire process or solution, where contributors spanning across the hybrid landscape are fully considered. Also, some embodiments herein might perform reinforcement learning based on user demonstrated behavior. In some embodiments, not only may the contributors be enhanced based on this learning (I.e., change associated rankings), but new contributors might be discovered (i.e., learned) based on the user behavior(s).

FIG. 13 is an illustrative flow diagram for a process 1300 related to a hybrid IT downtime suggestion system, according to an example embodiment. In some aspects, process 1300 includes features to determine a suggested downtime for a customer's hybrid IT landscape. In some regards, aspects of process 1300 have or may be understood by referencing the architecture 100 in FIG. 1 and the examples discussed above with respect to FIGS. 2-12. Accordingly, the following discussion of process 1300 may avoid repeating aspects disclosed elsewhere in the present disclosure and not as an indication that such features are not or cannot be included in some embodiment of process 1300.

At operation 1305, a request for a suggested downtime for a specified system within a hybrid IT landscape is received. In some instances, the request may be received from a customer such as, for example, an IT administrator of a given hybrid IT landscape for an entity (e.g., enterprise or other organization) and include an indication of a specified system. As used herein, the hybrid IT landscape includes at least one on premise system and at least one cloud-based system.

At operation 1310, a determination is made to ascertain at least one on premise contributor to a downtime for the hybrid IT landscape and at least one cloud-based contributor to the downtime for the hybrid IT landscape based on one or more executable processes depending on the specified system. In some aspects, some embodiments of a hybrid IT downtime suggestion system herein receive, are provided with, or otherwise obtain the at least one on premise contributor and the at least one cloud-based contributor from one or more different IT systems, services, and solutions, without limitations. In some cases, the contributor information might be obtained directly or indirectly from the different systems and can be received in various different data structures (e.g., messages, files, database tables, data streams, etc.). In some instances, the hybrid IT downtime suggestion system might aggregate the contributor information it receives, store it, and manage the persistence of such information in a data storage device.

Operation 1315 includes determining an ordered ranking for each of the at least one on premise contributor and the at least one cloud-based contributor. The ordered ranking of the contributors may act as an indication of a relative weight afforded each contributor by the hybrid IT downtime suggestion system herein.

Continuing to operation 1320, process 1300 generates, by a pretrained ML model, system, algorithm, service, or application, one or more downtime time slots based on input(s) including a combination of the at least one on premise contributor and the at least one cloud-based contributor and their respective associated ordered ranking.

At operation 1325, a suggested downtime for the specified system is presented in reply to the customer's request. The suggested downtime presented may be determined based on the generated downtime time slots of operation 1320. For example, the generated downtime time slots of operation 1320 might include multiples of the same or overlapping times (i.e., redundant times slots). The time slots presented at operation 1325 might avoid presenting redundant time slots. Examples of illustrative time slots generated herein and presented for selection to a customer in reply to their request are depicted in, for example, FIGS. 6, 8, 10, and 12 and details related thereto may be had by referring to the discussion of same hereinabove.

Figure 14:
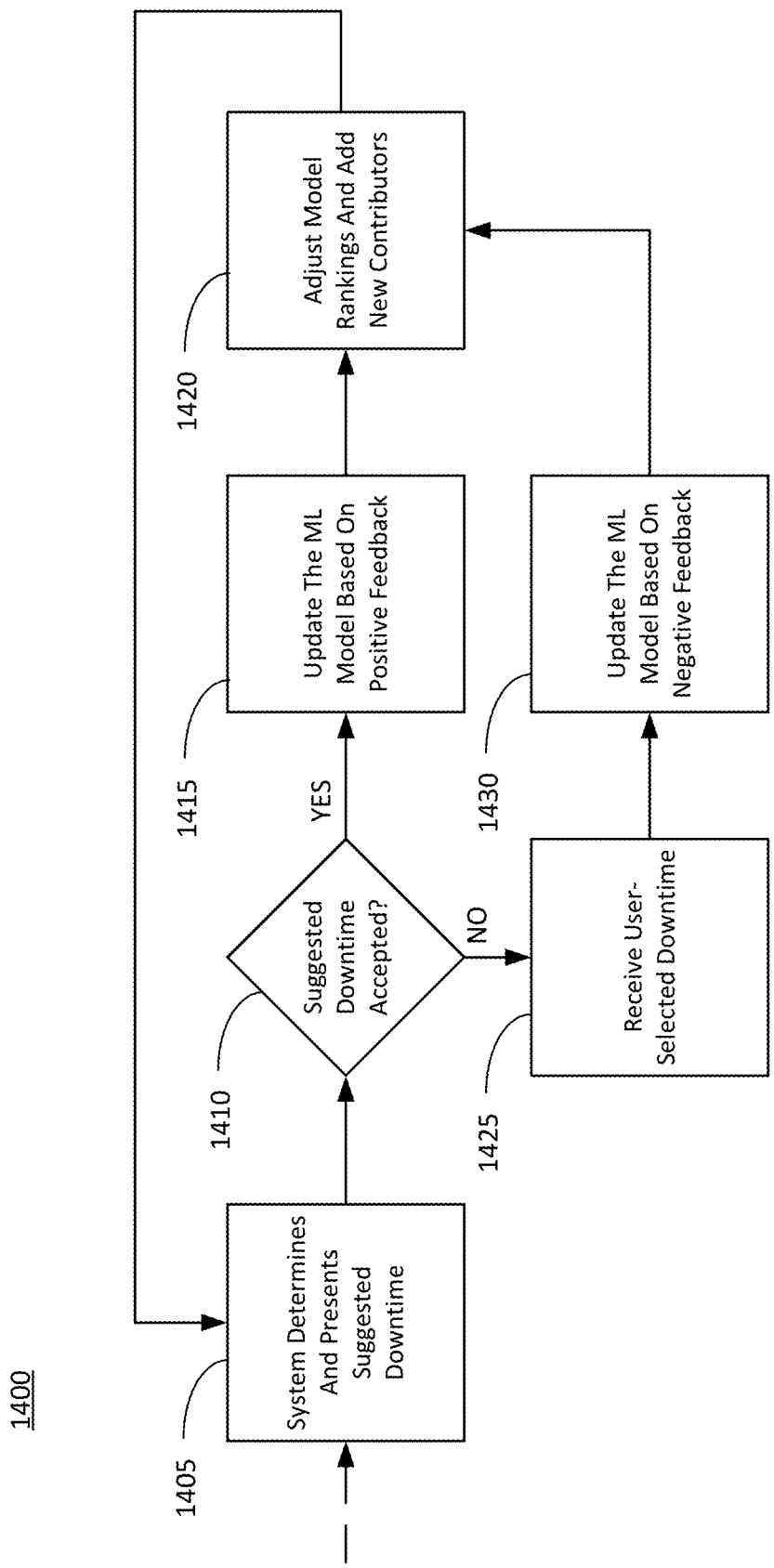
FIG. 14 is an illustrative process flow, according to an example embodiment.

FIG. 14 is an illustrative process flow, according to an example embodiment. In some aspects, process 1400 relates the aspects of suggesting a downtime for a hybrid IT landscape, including feedback of user behavior to a hybrid IT downtime suggestion system herein. For example, at operation 1405 the system determines and presents one or more suggested downtimes to the user. The determination may be performed by another process (e.g., process 1300), thus the dotted arrow into operation 1405. At 1410, a determination is made whether one of the suggested downtime(s) is selected by the user. If so, process 1400 proceeds to operation 1415 where a ML model herein may be updated with the positive feedback from the user. The feedback is considered positive since the user selected one of the suggested downtimes. Continuing to operation 1420, the ML model may adjust the rankings for the contributors and add new contributors for consideration (discussed above). The adjusted ML model may be used for future downtime suggestions for the user, as indicated by the arrow from operation 1420 back to operation 1405.

In the event operation 1410 determines one of the suggested downtime(s) is not selected by the user, process 1400 proceeds to operation 1425 where the downtime selected by the user (not from one of the suggested downtimes) is retained. At operation 1430, the ML model herein may be updated with the negative feedback from the user, where the feedback is considered negative since the user does not select one of the suggested downtimes. From 1430, the process proceeds to operation 1420 where the ML model is configured to adjust the rankings for the contributors and add new contributors for consideration, as discussed above. The adjusted ML model may be used for future downtime suggestions for the user, as indicated by the arrow back to operation 1405.

In some embodiments, a ML model herein might include or incorporate some aspects of a Learning to Rank (L2R) algorithm to determine the relevance and priority of each contributor used in some determinations herein. As disclosed herein, multiple factors might affect, impact, or otherwise influence the determination of a suggestion of a planned downtime for a hybrid IT landscape. Accordingly, some embodiments herein might use a ML learning model to prioritize or determine relative ordered ranks for the different contributors. In one embodiment, an input for a ML model herein might include, for a query q, n contributors (C), where $C=\{C1, C2, \ldots, CN\}$. The input to the model may be represented as $xi=(q, ci)$. The output, for a query and contributor input, $xi=(q, ci)$, might be represented by a suggestion score $si=f(xi)$. In some embodiments, a reinforced L2R algorithm may be used to prioritize the contributing factors. In some aspects, accuracy for the reinforced model might usually improve with repeated executions over time. In some instances, in an effort to provide accurate downtime suggestions, the model may be trained with real-world data sets that may also include human intervention data (e.g., user selections in reply to suggested downtimes).

Figure 15:
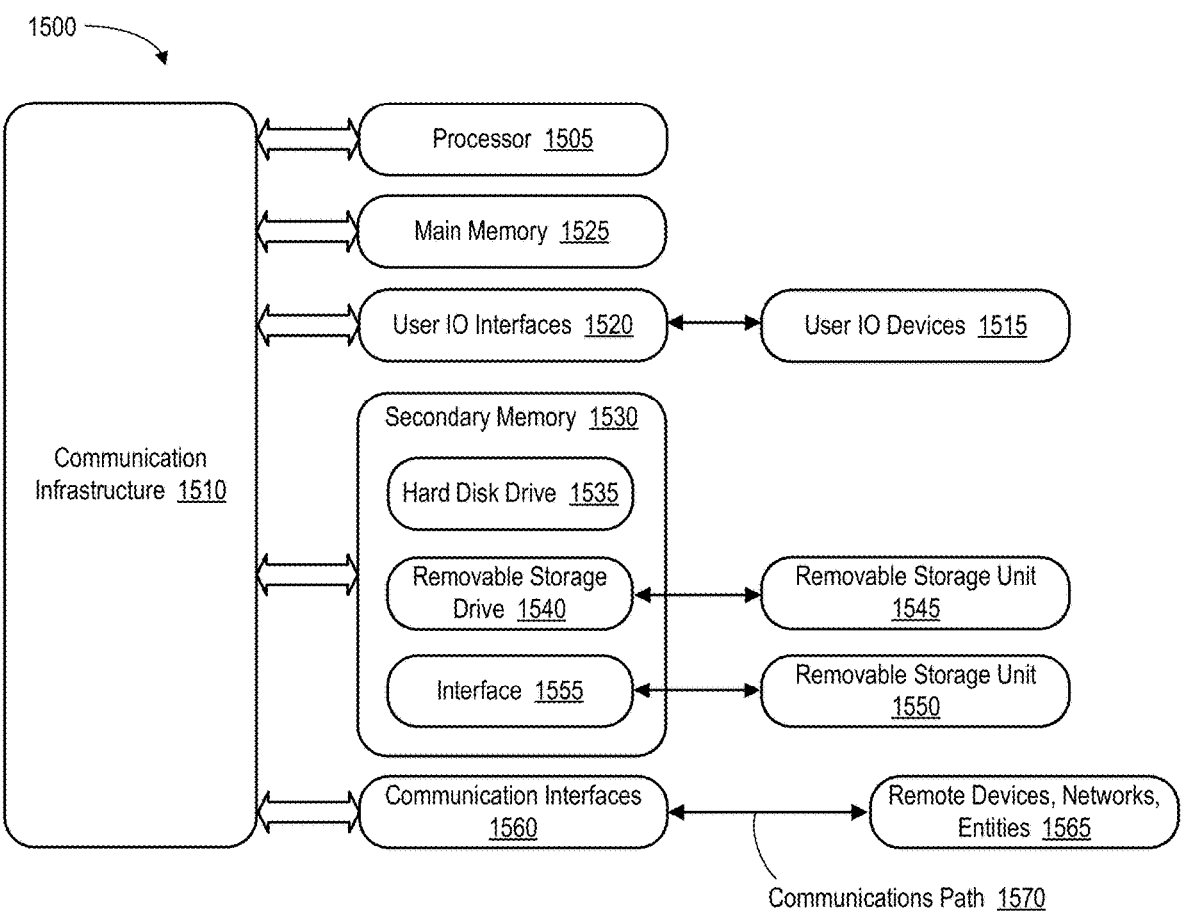
FIG. 15 is a block diagram of an apparatus useful for implementing various aspects disclosed herein, according to some example embodiments.

Various embodiments of a collaboration system and service disclosed herein may be implemented, for example, using one or more computer systems, such as computer system 1500 shown in FIG. 15. The computer system 1500 can be any computer capable of performing the functions described herein. Computer system 1500 includes one or more processors (also called CPUs), such as a processor 1505. Processor 1505 is connected to a communication infrastructure or bus 1510.

One or more processors 1505 may each be a Graphics Processing Unit ("GPU"). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1500 also includes user input/output device(s) 1515, such as monitors, keyboards, pointing devices, etc., that communicate with communication infrastructure xx06 through user input/output interface(s) 1520.

Computer system 1500 also includes a main or primary memory 1525, such as Random-Access Memory ("RAM"). Main memory 1525 may include one or more levels of cache. Main memory 1525 has stored therein control logic (i.e., computer software) and/or data.

Computer system 1500 may also include one or more secondary storage devices or memory 1530. Secondary memory 1530 may include, for example, a hard disk drive 1535 and/or a removable storage device or drive 1540. Removable storage drive 1540 may be a floppy disk drive, a magnetic tape drive, a compact disk drive, an optical storage device, tape backup device, and/or any other storage device/drive.

Removable storage drive 1540 may interact with a removable storage unit 1545. Removable storage unit 1545 includes a computer usable or readable storage device having stored thereon computer software (control logic) and/or data. Removable storage unit 1545 may be a floppy disk, magnetic tape, compact disk, DVD, optical storage disk, and/any other computer data storage device. Removable storage drive 1540 reads from and/or writes to removable storage unit 1545 in a well-known manner.

According to an exemplary embodiment, secondary memory 1530 may include other means, instrumentalities or other approaches for allowing computer programs and/or other instructions and/or data to be accessed by computer system 1500. Such means, instrumentalities or other approaches may include, for example, a removable storage unit 1550 and an interface 1555. Examples of the removable storage unit 1550 and the interface 1555 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1500 may further include a communication or network interface 1560. Communication interface 1560 enables computer system 1500 to communicate and interact with any combination of remote devices, remote networks, remote entities, etc. (individually and collectively referenced by reference number 1565). For example, communication interface 1560 may allow computer system 1500 to communicate with remote devices 1565 over communications path 1570, which may be wired and/or wireless, and which may include any combination of LANs, WANs, the Internet, etc. Control logic and/or data may be transmitted to and from computer system 1500 via communication path 1570.

In an embodiment, anon-transitory tangible apparatus or article of manufacture comprising a tangible computer useable or readable medium having control logic (software) stored thereon is also referred to herein as a computer program product or program storage device. This includes, but is not limited to, computer system 1500, main memory 1525, secondary memory 1530, and removable storage units 1545 and 1550, as well as tangible articles of manufacture embodying any combination of the foregoing. Such control logic, when executed by one or more data processing devices (such as computer system 1500), causes such data processing devices to operate as described herein.

Based on the present disclosure, it will be apparent to persons skilled in the relevant art(s) how to make and use embodiments of the invention using data processing devices, computer systems and/or computer architectures other than that shown in FIG. 15. In particular, embodiments may operate with software, hardware, and/or operating system implementations other than those described herein.

Although specific hardware and data configurations have been described herein, note that any number of other configurations may be provided in accordance with some embodiments of the present invention (e.g., some of the information associated with the databases and storage elements described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented. Embodiments are therefore not limited to any specific combination of hardware and software.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

Embodiments disclosed herein are solely for the purpose of illustration. Those in the art will recognize other embodiments may be practiced with modifications and alterations to that described above.

What is claimed is:

1. A computer-implemented method, the method comprising:
   receiving a request for a suggested downtime of a specified system within a hybrid information technology (IT) landscape, the hybrid IT landscape including at least one on premise system and at least one cloud-based system;
   determining, based on information regarding one or more executable processes depending on the specified system to implement the one or more executable processes, at least one on premise contributor to a downtime for the hybrid IT landscape and at least one cloud-based contributor to the downtime for the hybrid IT landscape, the at least one on premise contributor and the at least one cloud-based contributor each being a contributing factor to the downtime for the at least one on premise system and the at least one cloud-based system, respectively and each of the at least one on premise contributor and the at least one cloud-based contributor to a downtime for the hybrid IT landscape having a rank value associated with each of the at least one on premise contributor and the at least one cloud-based contributor;
   determining, based on their respective associated rank value, an ordered ranking of each of the at least one on premise contributor and the at least one cloud-based contributor, the ordered ranking providing a relative weight associated with each of the at least one on premise contributor and the at least one cloud-based contributor to a downtime for the hybrid IT landscape;
   generating, by a pretrained machine learning model based on an input to the pretrained machine learning model including a combination of the at least one on premise contributor and the at least one cloud-based contributor and their respective associated ordered ranking, one or more downtime time slots;
   presenting, in reply to the request and based on the generated downtime time slots, the suggested downtime for the specified system;
   receiving, in reply to the presentation of the suggested downtime for the specified system, an indication of a user-selected downtime for the specified system;
   in an instance the indication of the user-selected downtime for the specified system is one of the downtime time slots generated by the machine learning model, updating the machine learning model and adjusting the associated rank value for the at least one on premise contributor and the at least one cloud-based contributor based on the user-selected downtime;

in an instance the indication of the user-selected downtime for the specified system is exclusive of one of the downtime time slots generated by the machine learning model, updating the machine learning model and adjusting the associated rank value for the at least one on premise contributor and the at least one cloud-based contributor, wherein the adjusting of the ordered ranking is performed in response to the receiving of the indication exclusive of one of the downtime time slots generated by the machine learning model exceeds a threshold value; and generating, based on a second input including a combination of at least one on premise contributor and at least one cloud-based contributor and their respective adjusted associated rank value to the updated machine learning model, a second one or more downtime time slots.

2. The method of claim 1, wherein redundant time slots of the generated downtime time slots are excluded from the presentation of the suggested downtime for the specified system.

3. The method of claim 1, further comprising receiving an indication of at least one executable process depending on each of the at least one on premise system and the at least one cloud-based system in the hybrid IT landscape.

4. The method of claim 1, further comprising:
receiving an indication of the at least one on-premise contributor to the downtime for the hybrid IT landscape, including an associated time range; and
receiving an indication of the at least one cloud-based contributor to the downtime for the hybrid IT landscape, including an associated time range.

5. The method of claim 1, further comprising:
presenting, in reply to a second request for the suggested downtime and based on the second generated downtime time slots, the suggested downtime for the specified system.

6. The method of claim 5, further comprising determining, by the machine learning model, a new factor contributing to the downtime for the hybrid IT landscape based on at least the received indication of the user-selected downtime for the specified system.

7. The method of claim 1, wherein the at least one on premise contributor to the downtime and the at least one cloud-based contributor to the downtime includes at least one of a cloud maintenance period, a contractual maintenance period, an agreed service time, a specified exclusionary time, an available upgrade/patch, and an incident awaiting resolution.

8. A system comprising:
at least one programmable processor; and
a non-transitory machine-readable medium storing instructions that, when executed by the at least one programmable processor, cause the at least one programmable processor to perform operations comprising:
receiving a request for a suggested downtime of a specified system within a hybrid information technology (IT) landscape, the hybrid IT landscape including at least one on premise system and at least one cloud-based system;
determining, based on information regarding one or more executable processes depending on the specified system to implement the one or more executable processes, at least one on premise contributor to a downtime for the hybrid IT landscape and at least one cloud-based contributing to the downtime for the hybrid IT landscape, the at least one on premise contributor and the at least one cloud-based contributor each being a contributing factor to the downtime for the at least one on premise system and the at least one cloud-based system, respectively and each of the at least one on premise contributor and the at least one cloud-based contributor to a downtime for the hybrid IT landscape having a rank value associated with each of the at least one on premise contributor and the at least one cloud-based contributor;

determining, based on their respective associated rank value, an ordered ranking of each of the at least one on premise contributor and the at least one cloud-based contributor, the ordered ranking providing a relative weight associated with each of the at least one on premise contributor and the at least one cloud-based contributor to a downtime for the hybrid IT landscape;

generating, by a pretrained machine learning model based on an input to the pretrained machine learning model including a combination of the at least one on premise contributor and the at least one cloud-based contributor and their respective associated ordered ranking, one or more downtime time slots;

presenting, in reply to the request and based on the generated downtime time slots, the suggested downtime of the specified system;

receiving, in reply to the presentation of the suggested downtime for the specified system, an indication of a user-selected downtime for the specified system;

in an instance the indication of the user-selected downtime for the specified system is one of the downtime time slots generated by the machine learning model, updating the machine learning model and adjusting the rank value associated with the at least one on premise contributor and the at least one cloud-based contributor based on the user-selected downtime;

in an instance the indication of the user-selected downtime for the specified system is exclusive of one of the downtime time slots generated by the machine learning model, updating the machine learning model and adjusting the rank value associated with the at least one on premise contributor and the at least one cloud-based contributor, wherein the adjusting of the weight value is performed in response to the receiving of the indication exclusive of one of the downtime time slots generated by the machine learning model exceeds a threshold value; and generating, based on a second input to the updated machine learning model including a combination of at least one on premise contributor and at least one cloud-based contributor and an ordered ranking based on their respective adjusted rank value, a second one or more downtime time slots.

9. The system of claim 8, wherein redundant time slots of the generated downtime time slots are excluded from the presentation of the suggested downtime for the specified system.

10. The system of claim 8, further comprising receiving an indication of at least one executable process depending on each of the at least one on premise system and the at least one cloud-based system in the hybrid IT landscape.

11. The system of claim 8, further comprising:
receiving an indication of the at least one on-premise contributor to the downtime for the hybrid IT landscape, including an associated time range; and
receiving an indication of the at least one cloud-based contributor to the downtime for the hybrid IT landscape, including an associated time range.

12. The system of claim 8, further comprising:
presenting, in reply to a second request for the suggested downtime and based on the second generated downtime time slots, the suggested downtime for the specified system.

13. The system of claim 12, further comprising determining, by the machine learning model, a new factor contributing to the downtime for the hybrid IT landscape based on at least the received indication of the user-selected downtime for the specified system.

14. The system of claim 8, wherein the at least one on premise contributor to the downtime and the at least one cloud-based contributor to the downtime includes at least one of a contractual maintenance period, an agreed service time, a specified exclusionary time, an available upgrade/patch, and an incident awaiting resolution.

15. A non-transitory, computer readable medium storing instructions, which when executed by at least one processor cause a computer to perform a method comprising:
receiving a request of a suggested downtime for a specified system within a hybrid information technology (IT) landscape, the hybrid IT landscape including at least one on premise system and at least one cloud-based system;
determining, based on information regarding one or more executable processes depending on the specified system, at least one on premise contributor to a downtime for the hybrid IT landscape and at least one cloud-based contributor to the downtime for the hybrid IT landscape, the at least one on premise contributor and the at least one cloud-based contributor each being a contributing factor to the downtime for the at least one on premise system and the at least one cloud-based system, respectively and each of the at least one on premise contributor and the at least one cloud-based contributor to a downtime for the hybrid IT landscape having a rank value associated with each of the at least one on premise contributor and the at least one cloud-based contributor;
determining, based on their respective associated rank value, an ordered ranking of each of the at least one on premise contributor and the at least one cloud-based contributor, the ordered ranking providing a relative weight associated with each of the at least one on premise contributor and the at least one cloud-based contributor to a downtime for the hybrid IT landscape;
generating, by a pretrained machine learning model based on an input to the pretrained machine learning model including a combination of the at least one on premise contributor and the at least one cloud-based contributor and their respective associated ordered ranking, one or more downtime time slots;
presenting, in reply to the request and based on the generated downtime time slots, the suggested downtime for the specified system;
receiving, in reply to the presentation of the suggested downtime for the specified system, an indication of a user-selected downtime for the specified system;
in an instance the indication of the user-selected downtime for the specified system is one of the downtime time slots generated by the machine learning model, updating the machine learning model and adjusting the rank value associated with the at least one on premise contributor and the at least one cloud-based contributor;
in an instance the indication of the user-selected downtime for the specified system is exclusive of one of the downtime time slots generated by the machine learning model, updating the machine learning model and adjusting the rank value associated with the at least one on premise contributor and the at least one cloud-based contributor, wherein the adjusting of the weight value is performed in response to the receiving of the indication exclusive of one of the downtime time slots generated by the machine learning model exceeds a threshold value; and
generating, based on a second input to the updated machine learning model including a combination of at least one on premise contributor and at least one cloud-based contributor and an ordered ranking based on their respective adjusted rank value, a second one or more downtime time slots.

16. The medium of claim 15, wherein redundant time slots of the generated downtime time slots are excluded from the presentation of the suggested downtime for the specified system.

17. The medium of claim 15, wherein the medium storing instructions that, when executed by the at least one processor, cause the at least one processor to further perform operations comprising receiving an indication of at least one executable process depending on each of the at least one on premise system and the at least one cloud-based system in the hybrid IT landscape.

18. The medium of claim 15, wherein the medium storing instructions that, when executed by the at least one processor, cause the at least one processor to further perform operations comprising:
receiving an indication of the at least one on-premise contributor contributing to the downtime for the hybrid IT landscape, including an associated time range; and
receiving an indication of the at least one cloud-based contributor contributing to the downtime for the hybrid IT landscape, including an associated time range.

19. The medium of claim 15, wherein the medium storing instructions that, when executed by the at least one processor, cause the at least one processor to further perform operations comprising:
presenting, in reply to a second request for the suggested downtime and based on the second generated downtime time slots, the suggested downtime for the specified system.

20. The medium of claim 19, wherein the medium storing instructions that, when executed by the at least one processor, cause the at least one processor to further perform operations comprising determining, by the machine learning model, a new factor contributing to the downtime for the hybrid IT landscape based on at least the received indication of the user-selected downtime for the specified system.

* * * * *